United States Patent [19]

Ikehira

[11] Patent Number: 5,119,081
[45] Date of Patent: Jun. 2, 1992

[54] CONTROL APPARATUS OF IMAGE FILING SYSTEM

[75] Inventor: Kimimasa Ikehira, Hadano, Japan

[73] Assignee: Ricoh Company, Ltd.

[21] Appl. No.: 316,857

[22] Filed: Feb. 28, 1989

[30] Foreign Application Priority Data

Mar. 11, 1988 [JP] Japan .................... 63-56160

[51] Int. Cl.⁵ ............................................. G09G 1/06
[52] U.S. Cl. .................................... 340/723; 340/731; 340/735; 382/61; 382/55; 364/920.7; 364/DIG. 2; 395/144; 395/128
[58] Field of Search ............ 340/721, 723, 731, 735; 382/61, 55; 360/35.1, 72.2; 364/900 MS File, 200 MS File, 518, 521

[56] References Cited

U.S. PATENT DOCUMENTS

| 4,020,463 | 4/1977 | Himmel | 382/55 |
| 4,455,554 | 6/1984 | Demke | 340/731 |
| 4,604,653 | 8/1986 | Shimizu | 364/518 |
| 4,808,987 | 2/1989 | Takeda et al. | 340/723 |
| 4,829,453 | 5/1989 | Katsuta et al. | 340/723 |
| 4,931,957 | 6/1990 | Takagi et al. | 340/710 |

FOREIGN PATENT DOCUMENTS 3446593 11/1985 Fed. Rep. of Germany .
3826158 8/1988 Fed. Rep. of Germany .
212879 9/1987 Japan .
217367 9/1987 Japan .

Primary Examiner—Jeffery A. Brier
Assistant Examiner—Chanh Nguyen

[57] ABSTRACT

A control apparatus of an image filing system has an image memory device for storing high and low resolution image information for displaying an image on each page of a manuscript with high and low resolutions, respectively; a plurality of page buffers for temporarily storing the image information; an image search display device for reading the low resolution image information out of an optical disk to search the image and storing the read low resolution image information to one of the page buffers, and displaying the image on a screen by the low resolution image information; and an image processing device for reading the high resolution image information out of the optical disk to perform various kinds of designated image processing and storing the read high resolution image information to another one of the page buffers, and performing the various kinds of image processing with respect to the high resolution image information. The control apparatus further has a functional device for performing in parallel the various kinds of image processing with respect to the high resolution image information and the image display on the screen by the low resolution image information.

5 Claims, 12 Drawing Sheets

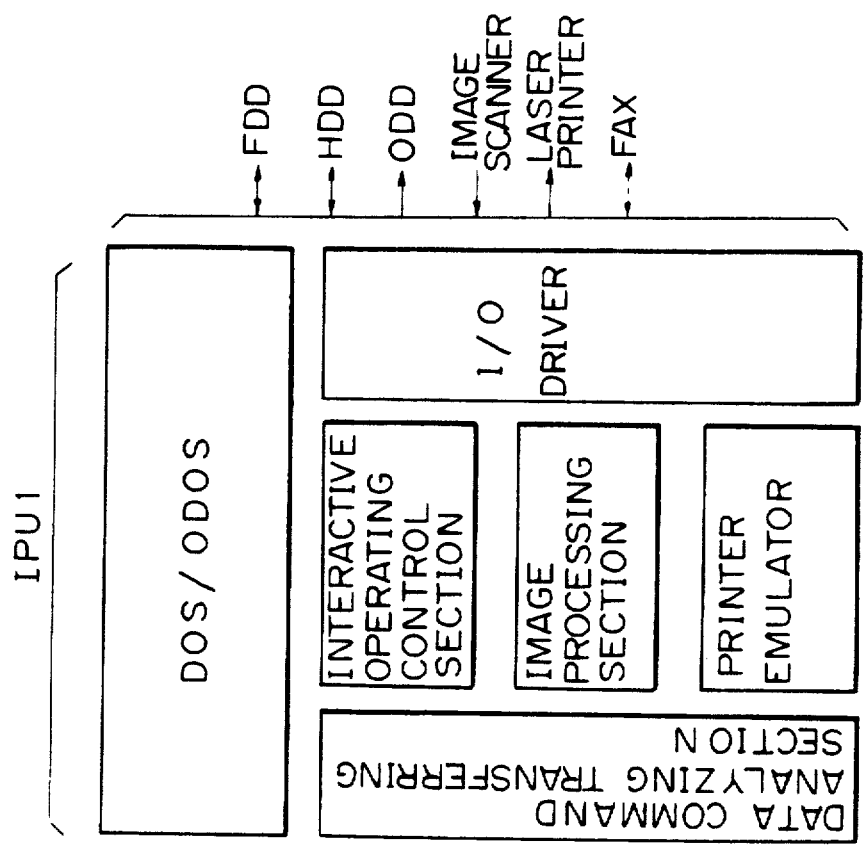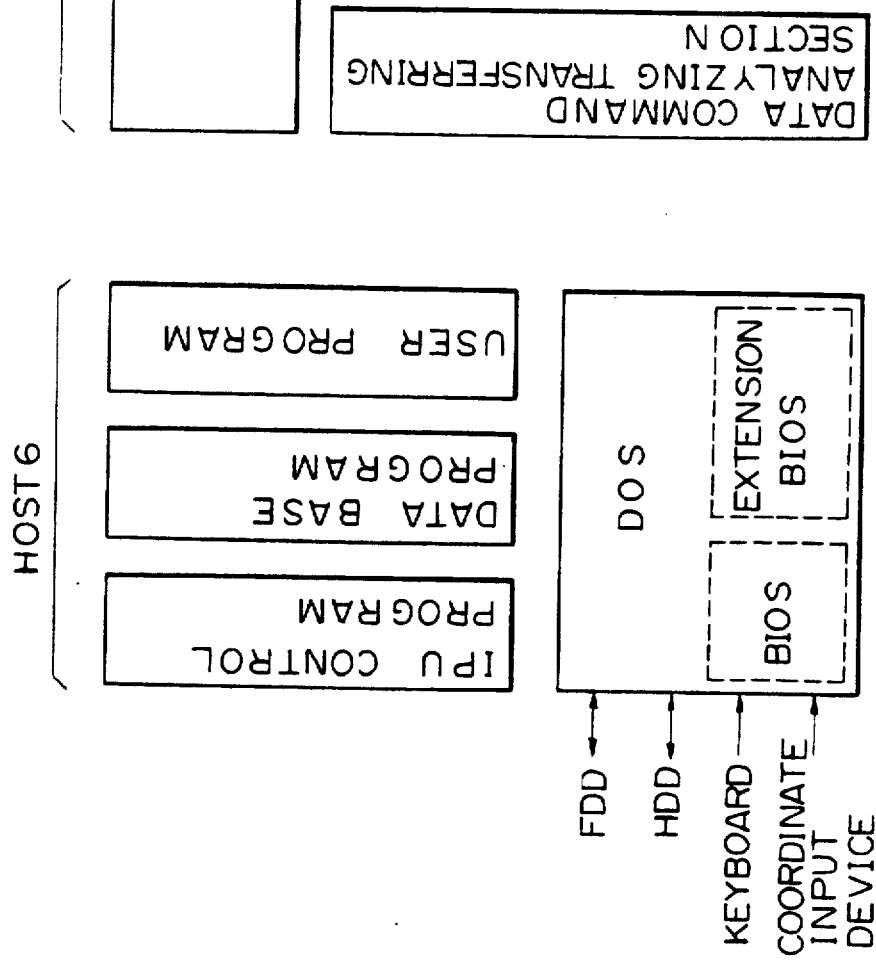

Fig. 7a

| ID CODE | FILE NAME | |
|---|---|---|
| id 1 | fn1 | ~Ta |
| id 2 | fn2 | |
| ⋮ | ⋮ | |
| id n | fnn | |

OD1 { (id 1, fn1)
OD2 { (id 2, fn2)
ODn { (id n, fnn)

Fig. 7b

PAGE — f1 ... fn

| PAGE | |
|---|---|
| 1 | VARIOUS KINDS OF SEARCH INFORMATION |
| 2 | VARIOUS KINDS OF SEARCH INFORMATION |
| ⋮ | ⋮ |
| m | VARIOUS KINDS OF SEARCH INFORMATION |

CONTROL APPARATUS OF IMAGE FILING SYSTEM

BACKGROUND OF THE INVENTION

The present invention relates to a control apparatus of an image filing system for performing image search and image processings.

In a conventional image filing system, an image of a manuscript such as a document, a drawing, etc. is read, suitably edited, recorded onto an optical disk and is managed.

In such a conventional image filing system, image information data provided by reading the manuscript image are compressed and recorded onto the optical disk. A required image is searched by reading out the recorded image information and displaying it on a CRT monitor, and is outputted onto a sheet of paper to be recorded by a printer, and various kinds of image processing such as edit, etc. are performed as needed.

Normally, the manuscript image is read at a resolution of about 200 to 400 dpi (dot/inch). When one page of a normal manuscript having size A4 for example is read at a resolution of 400 dpi, the obtained image information becomes about 2 MB(megabyte) but and becomes several tens of KB(kilobyte) even when the data are compressed, which still is a great amount of data. The resolution of the CRT monitor is about 100 to 150 dpi and the amount of data of one picture becomes about 125 KB.

Accordingly, in the above example, when the image of each page is displayed on the CRT monitor at the image information searching time, a great amount of information on each page is read out of the optical disk and is data-extended to an image information about 2 MB mentioned above, and further it is necessary to thin out the data-extended image information to an image information of about 125 KB in conformity with the resolution of the CRT monitor. Therefore, the time required to perform the respective operations becomes longer and it takes much time to perform the search processing.

Normally, an operator outputs the searched image onto a sheet of recorded paper by a printer and executes various kinds of image processing as needed. However, when it takes too much time to perform the search processing, the operator cannot rapidly perform the various kinds of image processing.

Conventionally, the following two systems for rapidly performing the various kinds of image processing have been used to perform the search processing at a high speed. Namely, one of the two systems, in the above example, comprises a processing section for performing only the image search processing in which the image information read out of the optical disk is not data-extended to the original image information having 2 MB, but is simultaneously extended and thinned out, directly outputting the image information having 125 KB in conformity with the resolution of the CRT monitor.

In accordance with such a system, the time after the image information is read out of the optical disk until the image information is displayed, is reduced and thereby the search processing is performed at a high speed.

However, since it is necessary to dispose a special processing section for performing only the image search processing in this system, the construction in hardware for such a section becomes complicated.

Further, in such a system, when various kinds of processing are performed with respect to the searched image information of, the original image information about 2 MB mentioned above is required so that the same image information is read out of the optical disk again and is data-extended by another processing section different from the above processing section to obtain the required image information.

Since the processing sections are separately used in the cases of the image search and image processing, it is necessary to switch executing modes such as image search mode and image processing mode. Therefore, the operator has to perform the switching operation of the executing modes each time, in accordance with the processings, and has to sequentially perform the processings in either one of the executing modes so that the operator cannot perform a parallel processing such as the search of another image during the image processing for example and various kinds of sequential processing cannot be rapidly performed.

On the other hand, in the other system for performing the search processing at a high speed, the image information of about 2 MB mentioned above and the image information of about 125 KB are both recorded onto the optical disk, and the latter image information is read out when the image is searched, and the former image information is read out when various kinds of image processings are performed.

In accordance with this system, since the image information read out of the optical disk is reduced when the image is searched, the processing time required to read out the image information and perform the data extension is shortened, thereby rapidly performing the search processing at a high speed.

However, even in such a system, similar to the first system, it is necessary to switch the executing modes such as the image searching mode and the image processing mode.

Therefore, the operator has to perform the switching operation of the executing modes and cannot perform the parallel processing of the image search and image processing so that various kinds of sequential processing cannot be rapidly executed.

SUMMARY OF THE INVENTION

It is therefore an object of the present invention to provide a control apparatus of an optical disk image filing system which can simplify the construction in hardware and rapidly execute various kinds of sequential processing.

The above object of the present invention can be achieved by a control apparatus of an image filing system comprising an image memory device for storing high and low resolution image information for displaying an image of each page of a manuscript with high and low resolutions, respectively; a plurality of page buffers for temporarily storing the image information; an image search display device for reading the low resolution image information out of an optical disk to search the image and storing the read low resolution image information to one of the page buffers, and displaying the image on a screen by the low resolution image information; an image processing device for reading the high resolution image information out of the optical disk to perform various kinds of designated image processing and storing the read high resolution image information to another one of the page buffers, and performing the various kinds of image processing with respect to the high resolution image information; and a functional device for performing in parallel the various kinds of image processing with respect to the high resolution image information and the image display on the screen by the low resolution image information.

Further objects and advantages of the present invention will be apparent from the following description of the preferred embodiments of the present invention as illustrated in the accompanying drawings.

BRIEF DESCRIPTION OF THE DRAWINGS

FIGS. 4a and 4b are block diagrams of the schematic construction in software in the system;

FIG. 7a is an explanatory view of a managing table;

FIG. 7b is an explanatory view of search information files;

DESCRIPTION OF THE PREFERRED EMBODIMENTS

The preferred embodiments of a control apparatus of an image filing system in accordance with the present invention will now be described in detail with reference to the accompanying drawings.

Figure 1:
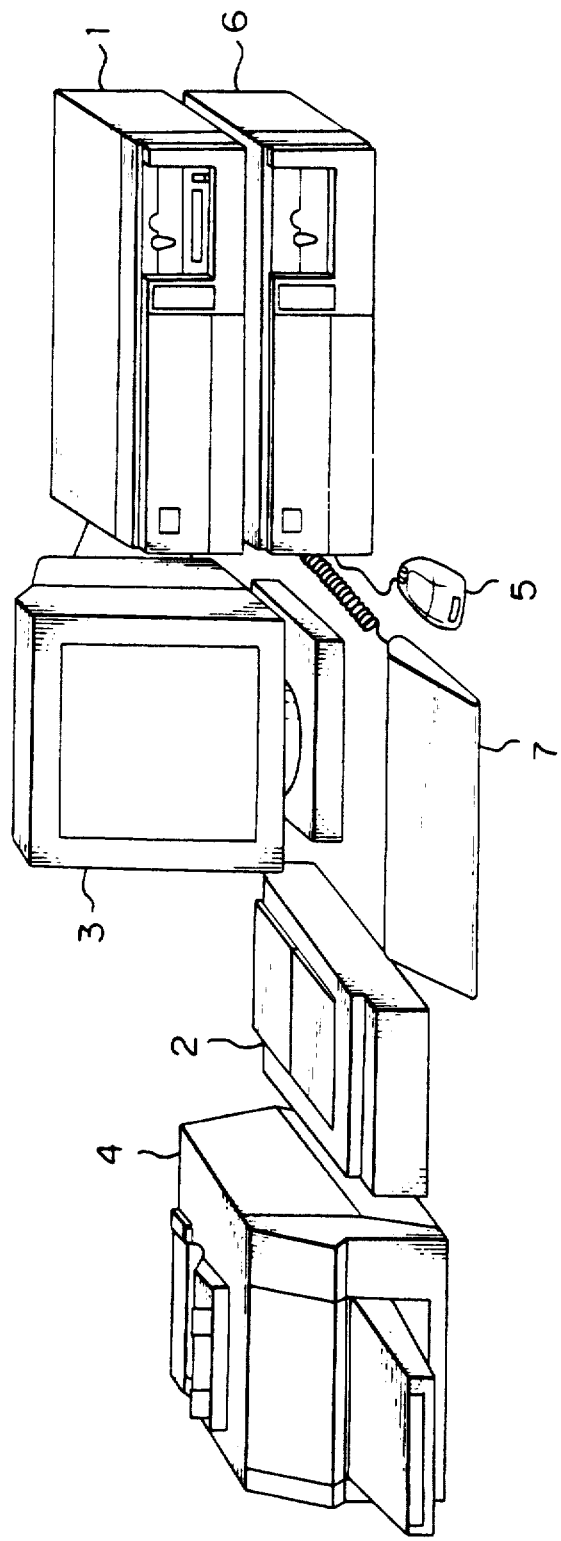
FIG. 1 is a perspective view showing the construction of an optical disk filing system in accordance with one embodiment of the present invention.

FIG. 1 shows the construction of an optical disk image filing system in accordance with one embodiment of the present invention. In FIG. 1, image processing unit (which is called IPU in the following description) 1 has an optical disk device therein and performs various kinds of image processing such as enlargement, reduction, synthesis, etc. with respect to inputted image information as needed, and stores the processed image information onto an optical disk and reads the stored image information out of the disk to perform further image processing, display or record processing.

IPU 1 is connected to image scanner 2 for reading a manuscript image, monitor 3 for displaying the image and having a high resolution, laser printer 4 for recording the image, coordinate input device 5 for operating IPU 1 according to an ICON image displayed on monitor 3, and host computer (which is called HOST in the following description) 6 which is a normal general purpose personal computer. In this embodiment, the resolution of image scanner 2 is set to be 300 dpi, and the resolution of monitor 3 is set to be 100 dpi.

HOST 6 manages information with respect to the image stored onto the optical disk in IPU 1 and comprises keyboard 7 for performing various kinds of operations.

Figure 2:
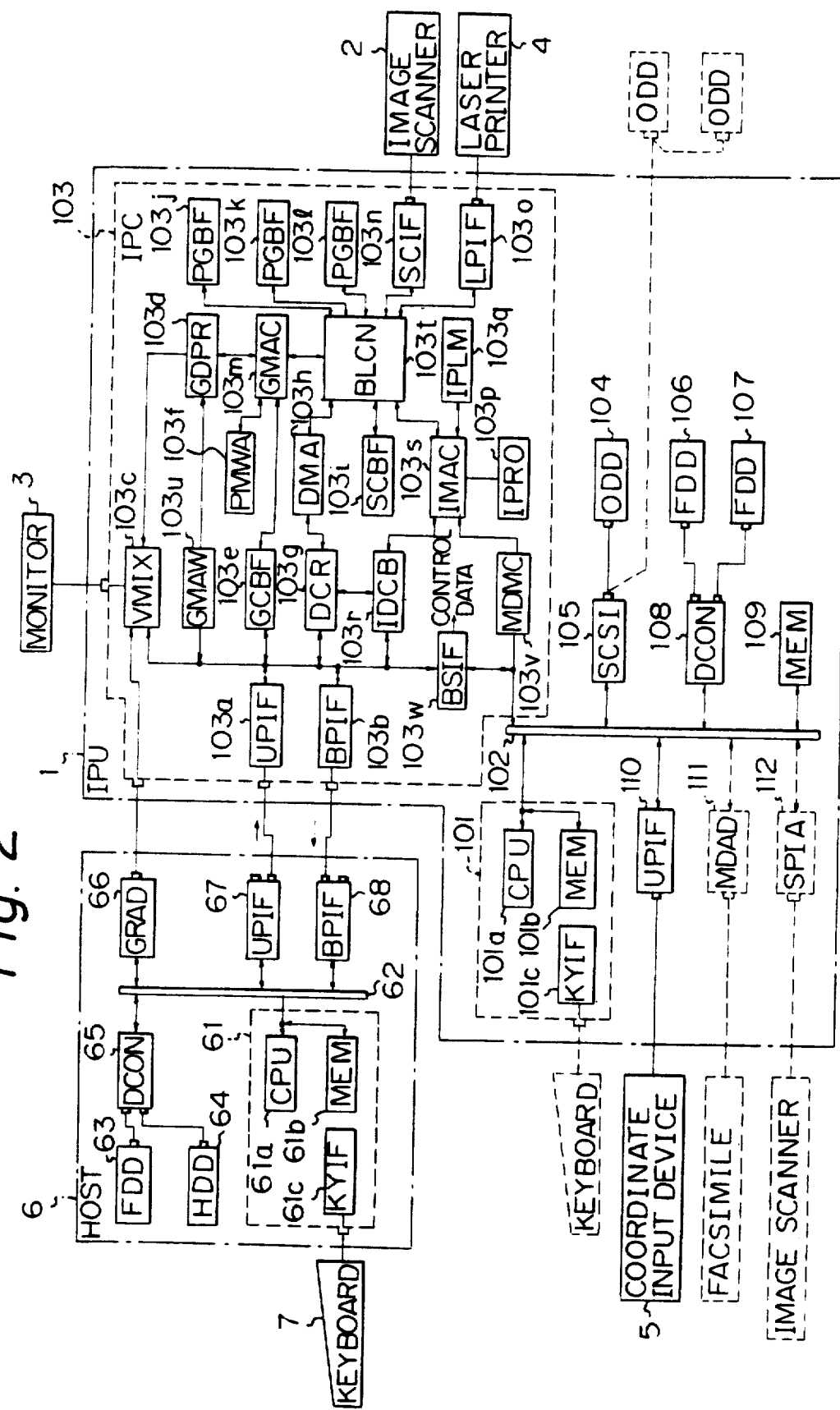
FIG. 2 is a block diagram of the construction of the above system.

FIG. 2 is a block diagram showing the constructions of IPU 1 and HOST 6. In this figure, main board 61 of HOST 6 is constituted by CPU 61a for managing and controlling the entire HOST 6, memory (which is called MEM in the following description) 61b for storing programs and data for the management and control, and keyboard interface circuit (which is called KYIF in the following description) 61c connected to keyboard 7, and is further connected to common bus 62.

Floppy disk drive device (which is called FDD in the following description) 63 and hard disk drive device (which is called HDD in the following description) 64 store software and managing data to be used, and are connected to common bus 62 through disk controller (which is called DCON in the following description) 65 for controlling these devices.

Common bus 62 is connected to graphic adapter (which is called GRAD in the following description) 66 for outputting a video signal for displaying the image on monitor 3, one-directional parallel interface circuit (which is called UPIF in the following description) 67 for outputting data by a parallel signal having 8 bits to the exterior, and parallel interface circuit (which is called BPIF in the following description) 68 for inputting and outputting data by the above parallel signal.

When HOST 6 is used as a stand alone, UPIF 67 is normally connected to a printer and BPIF 68 is connected to various kinds of terminal units, but UPIF 67 and BPIF 68 are respectively connected to IPU 1 in this embodiment.

Similar to the case of HOST 6, main board 101 on the side of IPU 1 is constituted by CPU 101a for managing and controlling the entire IPU 1, and MEM 101b for storing programs and data for the management and control, and KYIF 101c, and is further connected to common bus 102. KYIF 101c is connected to a keyboard when IPU 1 is used as a stand alone, but is not connected to the keyboard in this embodiment.

Common bus 102 is connected to image processing control board (which is called IPC in the following description) 103 having circuits for respectively performing image processing, SCSI interface adapter (which is called SCSI in the following description) 105 for transferring data with respect to optical disk drive device (which is called ODD in the following description) 104 by DMA system, FDD 106, DCON 108 for controlling HDD 107, extension memory (which is called MEM in the following description) 109 for storing various kinds of data similar to MEM 101b, UPIF 110 which is an interface circuit with respect to coordinate input device 5, etc.

ODD 104 stores an inputted image, and HDD 107 temporarily stores control programs of IPU 1, directory information of image files recorded in ODD 104, etc. FDD 106 is used for back-up of HDD 107.

Common bus 102 is also connected to modem adapter (which is called MDAD in the following description) 111 for inputting an image signal in a voice band transmitted from a facsimile device and taking out an image information, serial parallel interface adapter (which is called SPIA in the following description) 112 for performing the connection of an image scanner of interface different from image scanner 2, etc. in accordance with the necessity.

UPIF 103a within IPC 103 receives image data recorded in laser printer 4 from UPIF 67. BPIF 103b is connected to BPIF 68 to input and output various kinds of data and commands therebetween. Video mixer (which is called VMIX in the following description) 103c synthesizes a video signal produced on the side of IPC 103 and a video signal inputted from GRAD 66, and displays an image provided by synthesizing these signals on monitor 3.

Graphic display processor (which is called GDPR in the following description) 103d performs auxiliary image processings such as plotting of a graphic, enlargement and reduction of an image, and controls multi-window of a displayed picture, and produces a video signal, and so on. Graphic control buffer (which is called GCBF in the following description) 103e stores programs for performing the above respective processings, allocation information of the multi-window picture, etc.

Pattern memory working area (which is called PMWA in the following description) 103f temporarily stores pattern information of an ICON image displayed on monitor 3 and various kinds of images. Decoding composite circuit (which is called DCR in the following description) 103g data-compresses image information stored on the optical disk, etc. by a known data-compression system such as MMR system, and data-extends the image information read out of the optical disk, etc. DMA circuit (which is called DMA in the following description) 103h transfers data between various kinds of buffer memories and DCR 103g.

Screen buffer (which is called SCBF in the following description) 103i temporarily stores the image information displayed on monitor 3, and page buffers (which are called PGBFs in the following description) 103j to 103l temporarily store the image information for performing various kinds of image processings.

Graphic memory access controller (which is called GMAC in the following description) 103m controls the writing and reading-out operations of the image information with respect to the above respective buffers under the control of GDPR 103d.

Scanner interface circuit (which is called SCIF in the following description) 103n inputs the image information from image scanner 2, and laser printer interface circuit (which is called LPIF in the following description) 103o outputs the image information to laser printer 4.

Although GDPR 103d performs auxiliary image processing, image processor (which is called IPRO in the following description) 103p performs image processings at a higher level such as rotation of various kinds of graphics by an arbitrary angle, enlargement and reduction by a multiplying factor having a fraction, etc. Programs for performing such respective processings are stored in an internal ROM which is not shown.

Image processor local memory (which is called IPLM in the following description) 103q is a memory for storing various kinds of data and sequence information for performing the above image processings, and image control buffer (which is called IDCB in the following description) 103r temporarily stores the image information during such image processing. Image memory access controller (which is called IMAC in the following description) 103s controls the writing and reading-out operations of the image information of various kinds of buffers and memories, and transfers the data under the control of IPRO 103p.

Buffer location conductor (which is called BLCN in the following description) 103t switches the connections of PGBFs 103j to 103l and SCBF 103i with respect to the respective above circuits.

Figure 3:
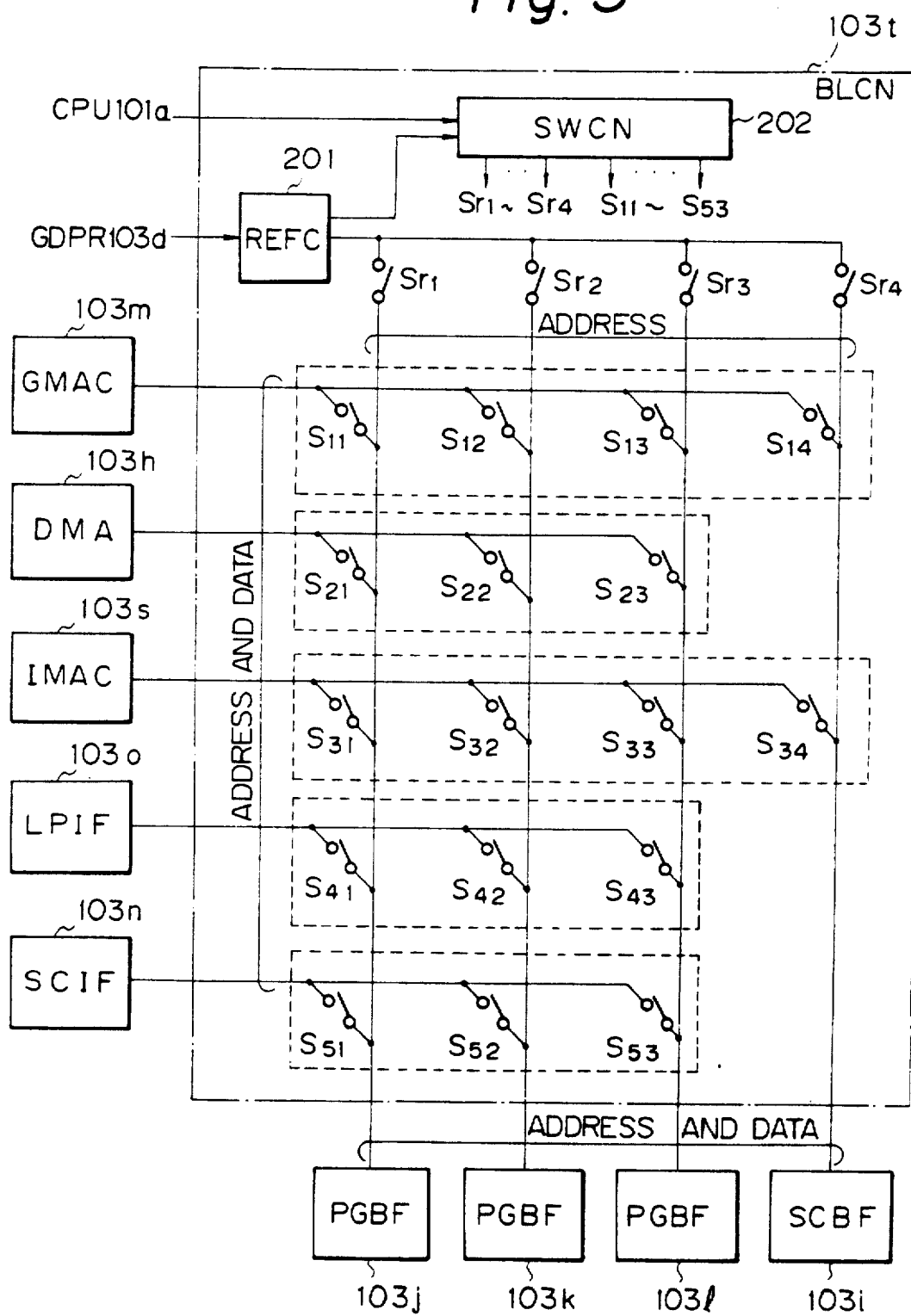
FIG. 3 is a block diagram of the schematic construction of a buffer location conductor in the system.

As illustrated in FIG. 3, in BLCN 103t, PGBFs 103j to 103l are respectively arbitrarily connected through a group of switches $S_{11}$ to $S_{53}$ to GMAC 103m, DMA 103h, IMAC 103s, LPIF 103o, SCIF 103n, and SCBF 103i is arbitrarily connected through these switches to GMAC 103m or IMAC 103s.

Since PGBFs 103j to 103l and SCBF 103i are constructed by dynamic RAMs, BLCN 103t comprises refresh controller (which is called REFC in the following description) 20l for updating these buffers, and a group of switches $Sr_1$ to $Sr_4$ for connecting REFC 201 to address lines of the above respective buffers. BLCN 103t further comprises switch controller (which is called SWCN in the following description) 202 for controlling switches $Sr_1$ to $Sr_4$ and switches $S_{11}$ and $S_{53}$ in accordance with a command of CPU 11a.

Switches $Sr_1$ to $Sr_4$ are turned on by SWCN 202 in a constant period, and the respective addresses of PGBFs 103j to 103l and SCBF 103i are accessed by REFC 201, thereby updating the stored data. Switches $S_{11}$ to $S_{53}$ are compulsorily turned off during the execution of the updating operation.

In the case of a data transferring operation with respect to PGBFs 103j to 103l, only one of switches $S_{1i}$ to $S_{ni}$ corresponding to one page buffer, and switches $S_{i1}$ to $S_{in}$ corresponding to PGBFs 103j to 103l and respective circuits 103m, 103h, 103s, 103o and 103n for transferring the data is turned on to prevent signal confusion.

In this embodiment, the address space on the side of CPU 101a is 64 kB, but the memory space as a total of GCBF 103e, PMWA 103f, SCBF 103i and PGBF 103j to 103l on the side of IPC 103 is 5 MB. Graphic memory access window (which is called GMAW in the following description) 103u is a gate circuit for dividing address space 5 MB every 64 KB and accessing thereto.

Monochrome display memory controller (which is called MDMC in the following description) 103v is operated when code information is converted to character font information to display a character on monitor 3.

Bus interface (which is called BSIF in the following description) 103w transfers data and control information between common bus 102 and respective circuits of IPC 103.

One ODD 104 is built in IPU 1 but, when the ODD is extended, the ODD can be used if the ODD is connected to SCSI 105.

FIGS. 4a and 4b show the schematic construction in software of the optical disk filing system. On the side of HOST 6, the system comprises a disk operation system (which is called DOS in the following description), a data base program, an IPU control program and a user program. The data base program is a program for managing information for searching an image recorded in ODD 104 on the side of IPU 1, and displaying a desired image on monitor 3 by performing the search, etc. based on designated information.

The IPU control program is a program started by the above data base program 2 and transmitting a control command to IPU 1 and receiving various kinds of data from IPU 1. The user program is a program such as various kinds of utility programs provided for a user as needed.

A standard basic input/output system (which is called BIOS in the following description) for controlling the inputting and outputting operations, and an extension BIOS for this system are provided inside DOS. Namely, when HOST 6 is the stand alone type, the printer is connected to UPIF 67 and thereby recorded data are transmitted in a constant sequential order determined by UPIF 67 during the execution of a general package software 2 such as the above data base program or in the case where information is recorded to the printer by a hard copy operation, etc. of HOST 6. The extension BIOS then transmits the data in a sequential order suitable for UPIF 103a such that UPIF 103a can correctly receive the data.

On the other hand, a DOS similar to the above one and an optical disk operating system (which is called ODOS in the following description) are provided on the side of IPU 1. When IPU 1 is the stand alone type, a data command analyzing transferring section analyses input data from the keyboard connected to KYIF 101c and transfers the analyzed data to a predetermined processing program. In this case, the data command analyzing transferring section performs a similar analyzing processing based on the input data from UPIF 103a and transfers the data from BPIF 103b to PBIF 68.

An interactive operating control section displays the ICON image on monitor 3 and reads a command instructed by coordinate input device 5 on the basis of this display.

An image processing section controls IPC 103 to execute various kinds of image processing and performs the recording and reading-out operations of the image information with respect to ODD 104.

When the information is recorded by the printer on the side of HOST 6 as mentioned above, a printer emulator transfers, as a first function, the recorded data transmitted from UPIF 67 to UPIF 103a to laser printer 4, and simulatively sets the same state as a state in which laser printer 4 is directly connected to UPIF 67. The printer emulator has a second function for processing the above data to image data storable onto the optical disk and filing the processed data with the optical disk.

These functions are fulfilled to further file, on the optical disk, image pictures such as various kinds of tables, graphs, etc. made on the host side. An I/O driver controls the input and output devices such as image scanner 2, laser printer 4, etc.

Figure 5:
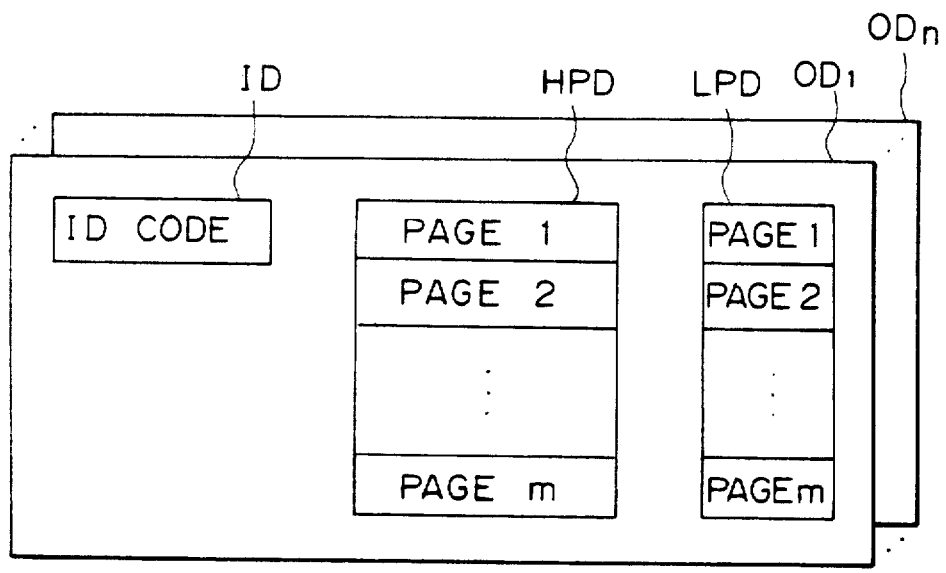
FIG. 5 is an explanatory view of record information on an optical disk.

In the image filing system in this embodiment, a plurality of optical disks $OD_1$ to $OD_n$ are prepared and one of them, namely, disk $OD_i$ is mounted onto ODD 104 for use. As shown in FIG. 5A, ID cord ID, high density image information HPD and low density image information LPD are recorded on each optical disk $OD_i$.

ID code ID is identification information of optical disk $OD_i$. High density image information HPD is a data-compressed one of the image information obtained by reading the manuscript from page 1 to the final page m with resolution 300 dpi. Low density image information LPD is information obtained by thinning out the image information read with resolution 300 dpi to an image information with resolution 100 dpi and data-compressing the thinned-out image information.

Figure 6:
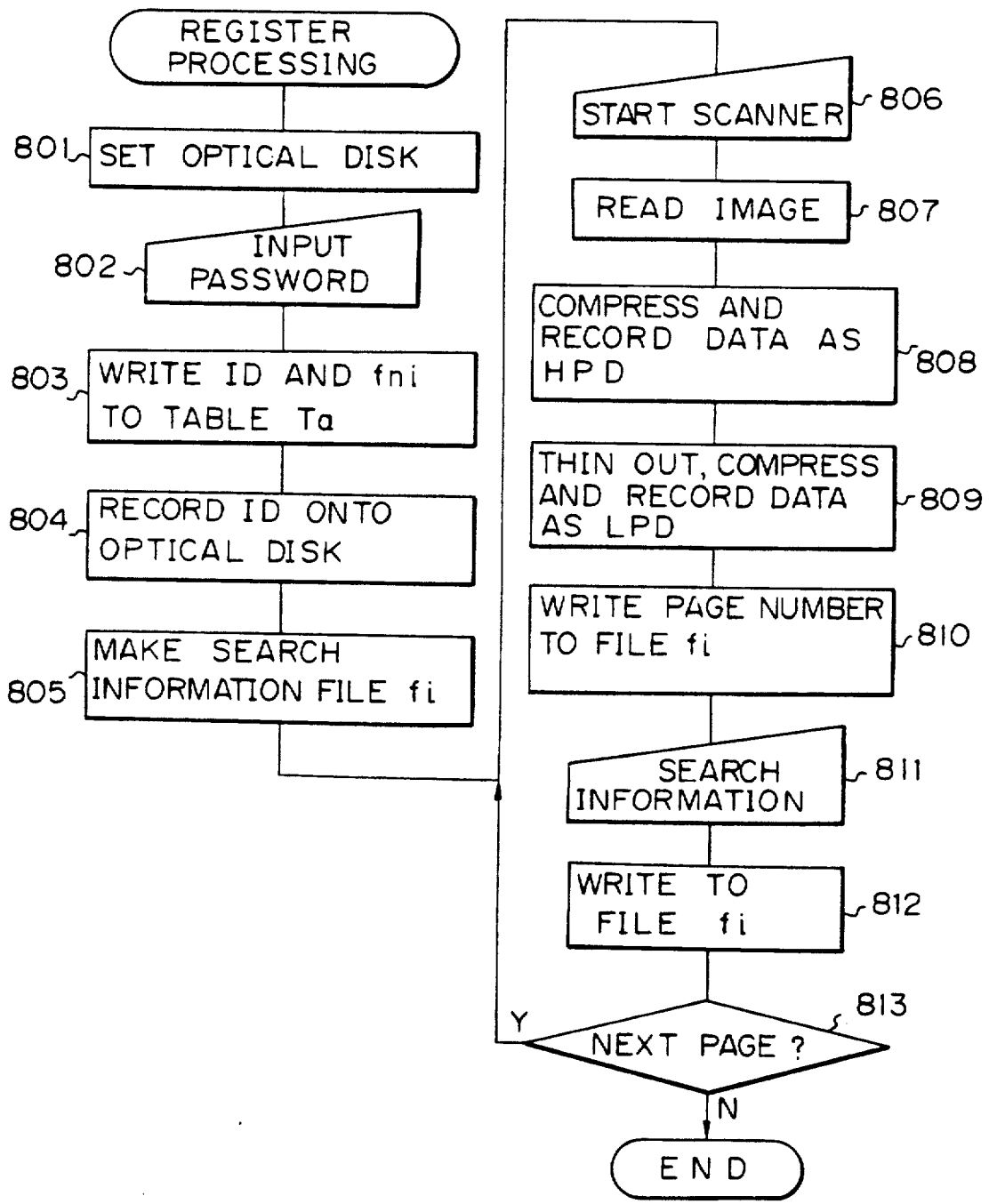
FIG. 6 is an operative flow chart of a register processing.

In the image filing system in the embodiment constructed above, when the image information is registered onto a new optical disk, as shown in FIG. 6, an operator first mounts the optical disk onto ODD 104 (step 801), and inputs an arbitrary password number to be set from keyboard 7 (step 802). At this time, a guidance for inputting the password number, character information from HOST 6, etc. are inputted from GRAD 66 to VMIX 103c in which the inputted information is synthesized with the image on the side of IPU 1 and is displayed on monitor 3.

As shown in FIG. 7a managing table Ta for managing respective optical disks $OD_1$ to $OD_n$ is created within HOST 6. When the above-mentioned password number is inputted, ID code idi is created on the basis of this number and a series of characters are combined with each other in a constant sequential order to create file name $f_{ni}$. Then, ID cord idi and file name $f_{ni}$ are written onto managing table Ta (step 803).

Subsequently, ID code idi is transferred onto the side of IPU 1 through BPIF 68 and BPIF 103b. In IPU 1, ID code idi is temporarily stored to MEM 101b through BSIF 103w and is thereafter transferred to ODD 104 from SCSI 105, thereby recording ID code idi on optical disk ODi(step 804).

As shown in FIG. 7b, in HOST 6, search information file $f_i$ for storing information with respect to image information recorded on optical disk ODDi, i.e., various kinds of search information such as documents, drawings, dates every one page, titles, keywords, etc. is creat within HDD 64 corresponding to file number $f_{ni}$ (step 805).

The ICON image for designating various kinds of processing is displayed on monitor 3. An operator sets a manuscript at image scanner 2 and operates coordinate input device 5 to designate the above ICON image and then starts image scanner 2(step 806).

Thus, image scanner 2 reads the manuscript image with resolution 300 dpi. The obtained image information is temporarily stored to one page buffer such as PGBF 103j through SCIF 103n and BLCN 103r(step 807). When the standard manuscript having size A4 is read with resolution 300 dpi, the amount of data of the image information is about 1 MB.

This image information is transferred to DCR 103g through PGBF 103j, BLCN 103r and DMA 103h, and is then data-compressed to an amount of data about 40 KB in this DCR. This data-compressed image information is stored to IDCB 103r and is thereafter transferred to ODD 104 through BSIF 103w and SCSI 105, and is recorded on optical disk ODDi as high density image information HPD corresponding to one page(step 808).

Next, the same image information as that of PGBF 103j is read out again and transferred to IMAC 103s through BLCN 103r. IMAC 103s thins out this image information with resolution 300 dpi to an image information with resolution 100 dpi, namely, reduces the manuscript image to an image which can be displayed in real size on monitor 3. The amount of data of the image information is reduced to about 125 KB by this thinning-out processing. The thinned-out image information is transferred to another one page buffer such as PGBF 103k.

Thereafter, as mentioned above, this image information is transferred to DCR 103g in which the image information is data-compressed to an amount of data about 8 KB, and further this data-compressed information is transferred to ODD 104 in which the information is recorded on optical disk ODDi as low density image information LPD corresponding to one page(step 809).

Subsequently, recorded page number $P_k$ is transmitted to HOST 6 through BPIF 103b and BPIF 68 and is written to file $f_i$(step 810).

Next, the operator inputs various kinds of search information with respect to this recorded page from keyboard 7(step 811). The inputted search information is written to a predetermined area of file $f_i$(step 812).

When the operator wants to register another manuscript page(Y in step 813), image scanner 2 is started and a similar operation is executed(to step 806). Thus, a predetermined information of each page is recorded onto optical disk ODi.

When there is no manuscript page to be registered(N in step 813), the above register processing is completed.

Figure 8:
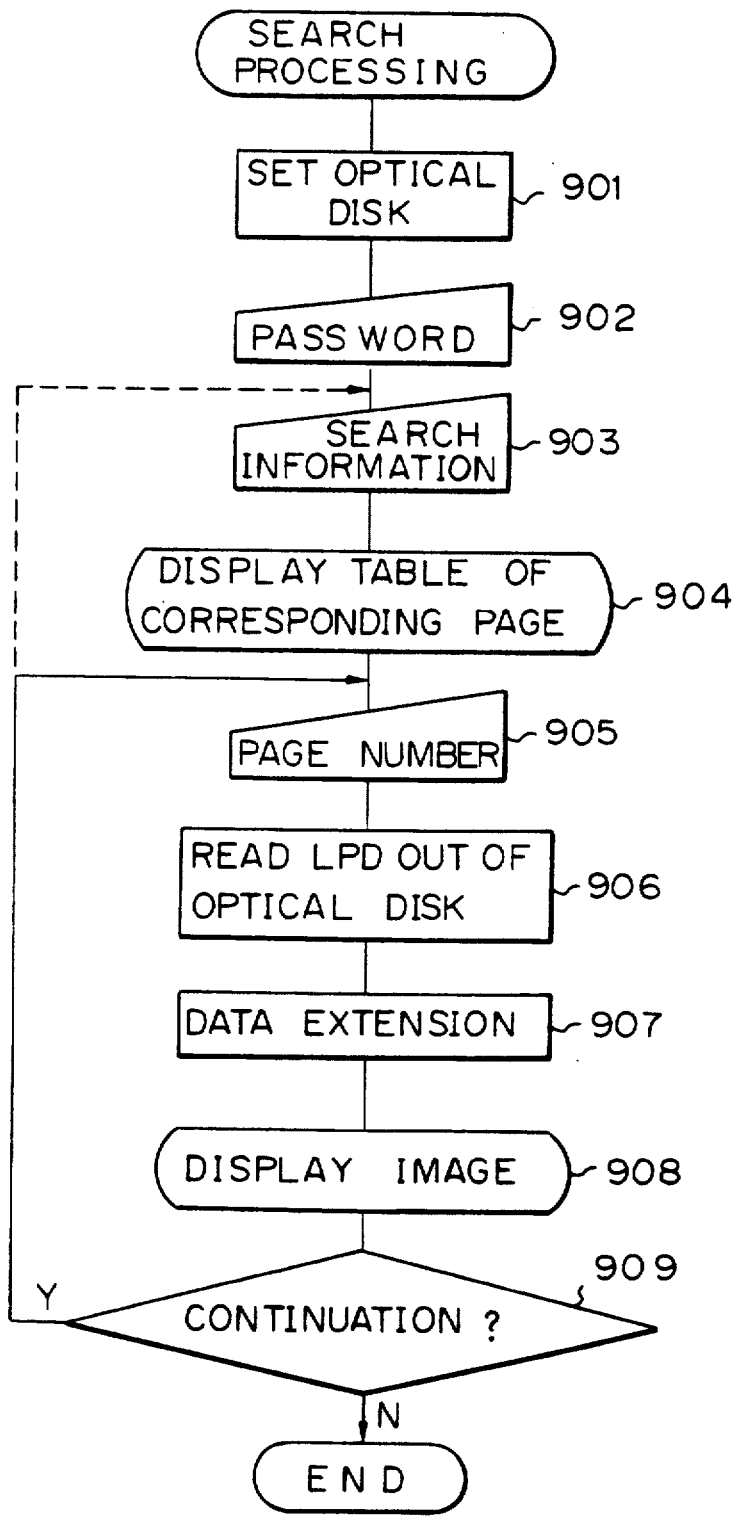
FIG. 8 is an operative flow chart of a search processing.

When a desired image is searched from the optical disk recorded as above, as shown in FIG. 8, optical disk ODi is set onto ODD 104(step 901) and the password number set at the above-mentioned register processing time is inputted from keyboard 7(step 902).

In IPU 1, ID code ID of optical disk ODi is read out and transmitted to HOST 6 in which it is determined whether the above password number is correct or not from the transmitted content. When the password number is correct, managing table Ta is read out of HDD 64 and thereby corresponding file number $f_{ni}$ is discriminated and this file is then opened.

The operator inputs various kinds of search information such as document names, keywords, etc. from keyboard 7(step 903).

In HOST 6, the judgment is made with respect to pages corresponding to such search information based on the above file $f_i$, displaying a table of the corresponding pages on monitor 3(step 904).

The operator then inputs a page number for confirming the content from this table(step 905).

The inputted page number is transmitted to IPU 1 in which ODD 104 is controlled to read out low density image information LPD of the above page number on optical disk ODi(step 906).

The read-out low density image information LPD is transferred to one page buffer such as PGBF 103j and is further transferred to DCR 103g to extend the data. In the case of a standard manuscript having size A4, the data are returned by the data extension to the image information data about 125 KB. Subsequently, these image information data are stored to SCBF 103i(step 907).

The image information stored to SCBF 103i is transferred to GDPR 103d through BLCN 103t and GMAC 103m and is converted to a predetermined video signal in the GDPR. This video signal is inputted to VMIX 103c and the image designated by the page number operated by the operator is displayed on monitor 3(step 908).

Figure 9:
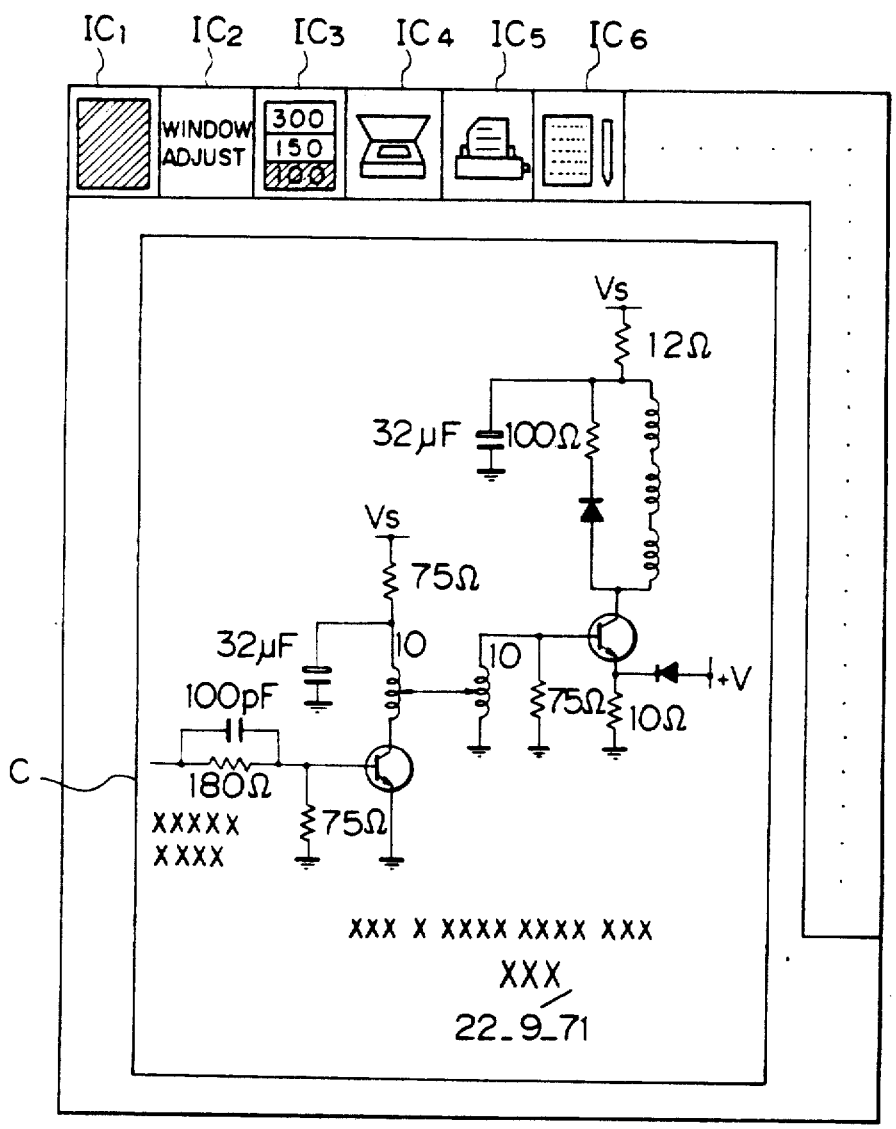
FIG. 9 is a view showing an example of a screen display.

FIG. 9 illustrates an example of screen display on monitor 3 in which searched circuit diagram c is displayed. An ICON image for performing various kinds of operations by the operator with respect to IPU 1 is displayed in upper and right side portions of the screen. For example, $IC_1$ is a layout display for showing what portion is displayed in the manuscript image on one page. $IC_2$ is a display for arbitrarily changing the displayed range. $IC_3$ is a display for switching the multiplying factor of the displayed image at three stages such as 100%, 150% and 300% and displaying the multiplying factor set at the present time. $IC_4$ is a display for instructing the start of image scanner 2 and $IC_5$ is a display for instructing the start of laser printer 4. $IC_6$ is a display for instructing the start of an editing processing of the image. In addition, various kinds of ICON images for designating the saving of the image information to HDD 64, instructing a hard copy on the screen, etc. are displayed.

The multiplying factor is set to 100% in this search processing when no special designation thereof is made, and therefore the image on each page is displayed in real size on monitor 3. Further, since the resolution of monitor 3 is 100 dpi, the manuscript can be adequately read if it is a standard manuscript.

When the operator wants to see the content on another page(Y in step 909), this content can be similarly displayed by inputting the appropriate page number(to step 905). Further, when the operator designates another search item(to step 903), a corresponding table on the page number is similarly displayed on the monitor.

The operator can perform various kinds of image processing with respect to the image displayed on monitor 3.

Figure 10:
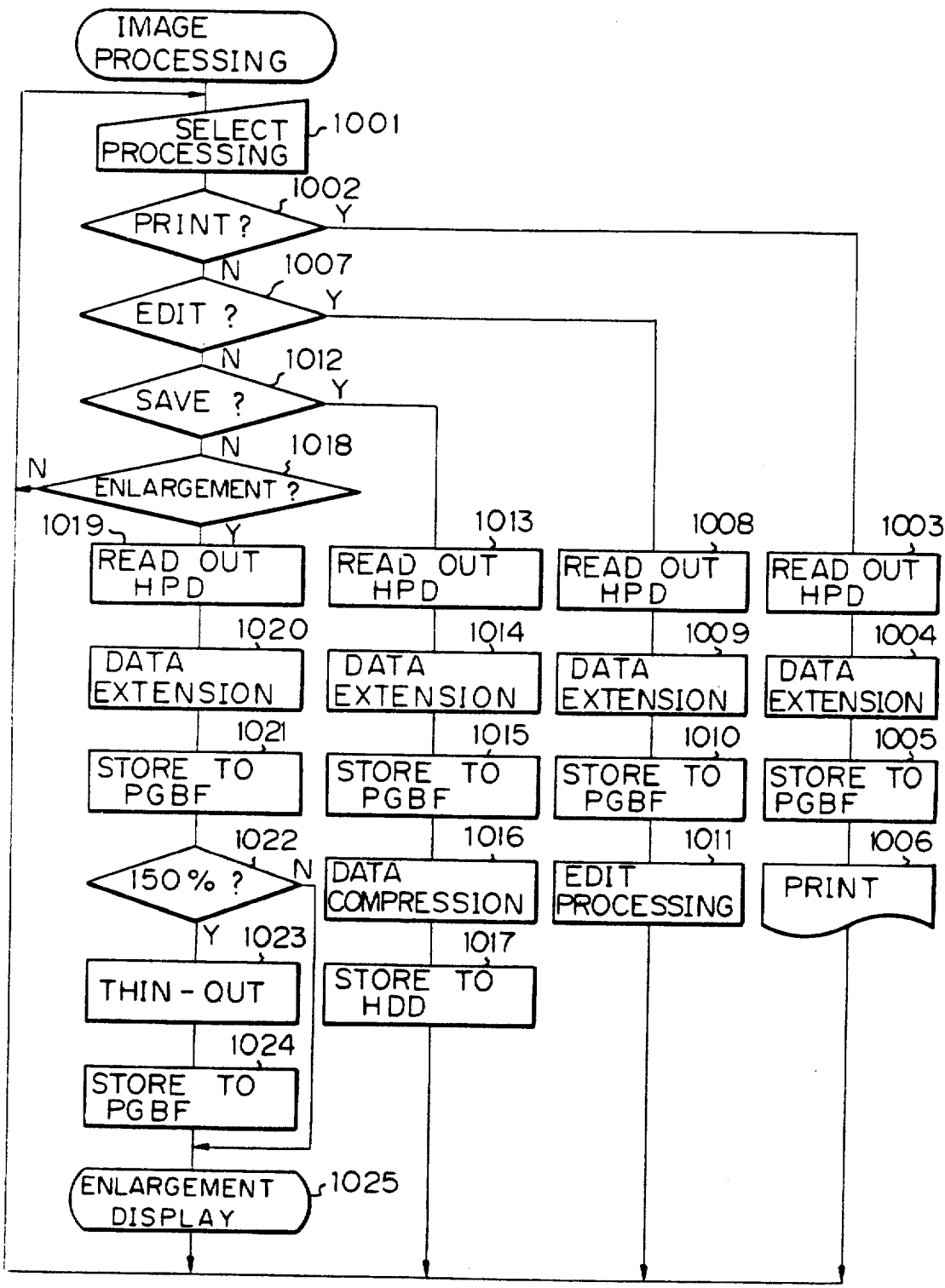
FIG. 10 is an operative flow chart showing various kinds of image processing.

FIG. 10 shows such image processing operations. The operator selects a desired processing by operating coordinate input device 5 to move a cursor to one of the various kinds of ICON images(step 1001). For example, when ICON image $IC_5$ is designated and the printing processing is selected(Y in step 1002), high density image information HPD on the displayed page number on the optical disk ODDi is read out(step 1003).

High density image information HPD is transferred to one page buffer through BSIF 103w and IDCB 103r, and is further transferred to DCR 103g to extend the data. High density image information HPD is an information which is read by image scanner 2 with resolution 300 dpi and provided by data-compressing the image information having data amount about 1 MB to image information about 125 KB in the case of a standard manuscript having size A4. Accordingly, the image information is returned to data amount about 1 MB by the above data-extension, and is temporarily stored to another page buffer such as PGBF 103f(step 1005).

Then, the image information is sequentially read out of PGBF 103j and transferred to laser printer 4 through BLCN 103t and thereby the image having high resolution 300 dpi is recorded(step 1006).

Next, when the operator designates the edit processing(Y in step 1007), high density image information HPD on the displayed page number is read out and data-extended, and this image information is temporarily stored to one page buffer(steps 1008 to 1010).

The image information stored to this page buffer is processed by a predetermined editing operation by the operator(step 1011).

When the operator next designates saving of the image information to HDD 64 as in the case where the image is temporarily exited(Y in step 1012), as mentioned above, high density image information HPD on the displayed page number is read out and data-extended, and this image information is temporarily stored to one page buffer(steps 1013 to 1015). Subsequently, the image information of this page buffer is data-compressed by DCR 103g again(step 1016) and is transferred to HOST 6 through BPIF 103b and BPIF 68). This image information is stored to HDD 64 in HOST 6(step 1017).

In the above case, the searched and displayed image is set to be stored to HDD 64 as it is, but it is also possible to store an image provided by performing the edit processing to HDD 64 similarly.

Next, when the searched and displayed image is enlarged, the operator designates multiplying factor 150% or 300% by ICON image $IC_3$. When the multiplying factor is designated(Y in step 1018), as mentioned above, high density image information HPD on the displayed page number is read out and data-extended, and this image information is temporarily stored to one page buffer(steps 1019 to 1021).

When multiplying factor 150% is designated(Y in step 1022), since the image information of the above page buffer is an image information having resolution 300 dpi, i.e., an image information corresponding to multiplying factor 300%, this image information is thinned out by IMAC 103s to an image information having resolution 150 dpi, i.e., an image information having multiplying factor 150%(step 1023) and is stored to another page buffer(step 1024).

When the thinning-out processing is performed, the image information of this another page buffer is transferred to SCBF 103i, and when the thinning-out processing is not performed, the image information of the page buffer in step 102l is transferred to SCBF 103i, displaying the respective images on monitor 3(step 1025).

Figure 11:
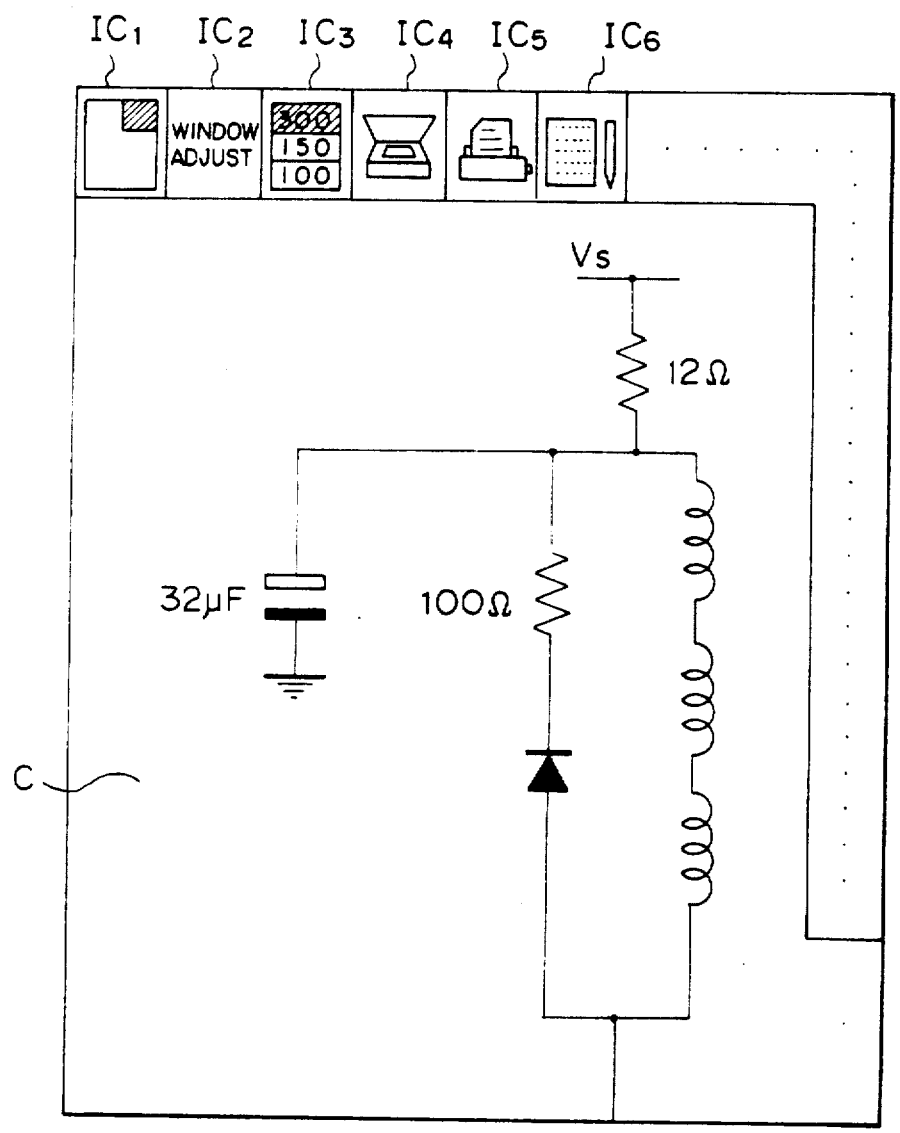
FIG. 11 is a view showing another example of a screen display.

FIG. 11 illustrates a display example in the case where the image shown in FIG. 9 is enlarged by multiplying factor 300% ICON image $IC_1$ displays that the displayed image is enlarged by three times and a right upper portion on one page is displayed at the present time.

In addition, it is possible to read the manuscript image as in the case of FIG. 6.

In the above-mentioned image processing, a plurality of processes can be simultaneously executed in parallel to each other by designating one process during the execution of another process.

Figure 12:
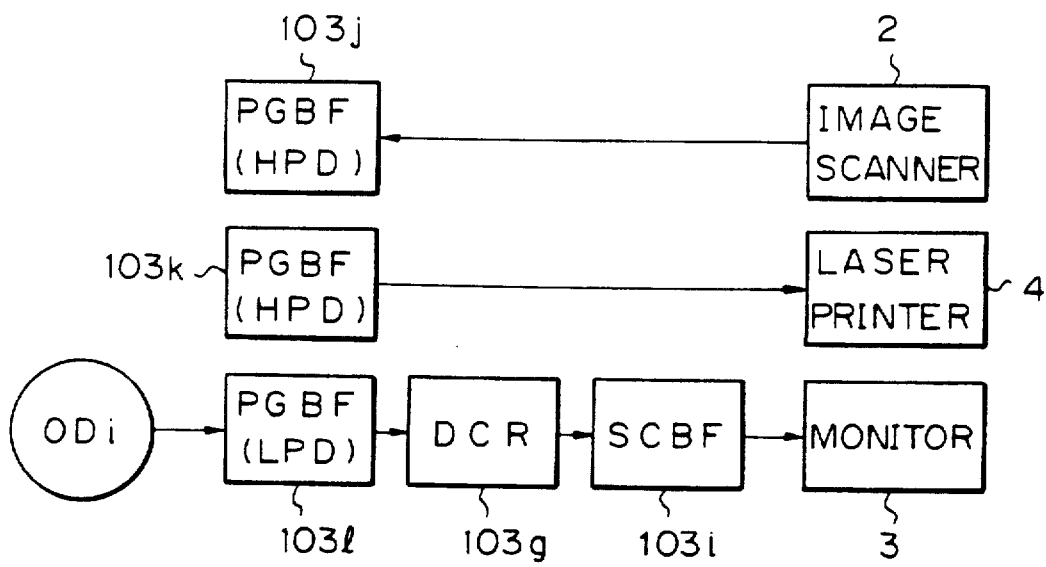
FIG. 12 is an explanatory view of parallel operations of various kinds of processings.

FIG. 12 shows one example of such a parallel processing in which, while the manuscript image is read by image scanner 2 and is being transferred to PGBF 103j, another image within PGBF 103k is recorded by laser printer 4 and low density image information LPD on the optical disk is further read out to PGBF 103l and is displayed as an image, performing the search processing thereof.

As mentioned above, in the embodiment of the present invention, the image filing system comprises three PGBFs 103j to 103l for recording the image on each page of the manuscript onto optical disk ODi as high resolution image information HPD and low resolution image information LPD, and temporarily storing the image information read out of optical disk ODi. When the image is searched, low resolution image information LPD on the corresponding page is read out of optical disk ODi and is stored to one of the three PGBFs 103j to 103l to display the image.

The amount of data of low resolution image information LPD is reduced to 1/9 with respect to the image information of high density image information HPD, thereby executing the reading and data-extending processing of the information from optical disk ODi at a high speed. Therefore, it is not necessary to have a dedicated processing section for data-extending and thinning out the image information as in the conventional system, thereby simplifying the construction in hardware and rapidly performing the image search operation. As a result, the image on each page in real size can be displayed within one second in a practical system. Further, since the image in real size has resolution 100 dpi, a normal manuscript can be easily read.

When various kinds of image processing are performed with respect to a specific image, high resolution image information HPD on the corresponding page is read out of the optical disk and is stored to another one of PGBFs 103j to 103l, performing a predetermined image processing with respect to the stored information.

Since the image information is stored to plural PGBFs 103j to 103l to perform the respective processes, the screen display for image search and the various kinds of image processing can be performed in parallel to each other so that it is not necessary for an operator to switch the executing modes. Further, a plurality of processes are simultaneously executed in parallel as in the search processing during the image recording operation so that a series of processes can be rapidly executed.

In the above-mentioned embodiment, high density image information HPD is set to resolution 300 dpi, but the present invention can be similarly applied even when the amount of data of the image information is large as in the case of resolution 400 dpi to 1200 dpi for example. Furthermore, as the amount of data is larger, the benefits of the present invention, in which low density image information LPD is separately recorded, are further improved.

In the above embodiment, three PGBFs 103j to 103l are disclosed, but more than three PGBFs can be used to perform in parallel a greater number of processes than in the case of using three PGBFs. Further, the present invention is not limited to an optical disk image filing system, but can be similarly applied to an image filing system for storing an image by a memory device such as various kinds of disk units.

As mentioned above, in the present invention, the system comprises a plurality of page buffers for recording the image on each page of a manuscript onto an optical disk as high resolution image information and low resolution image information, and for temporarily storing the image information. When the image is searched, the corresponding low resolution image information is read out of the optical disk and is stored to one page buffer, thereby displaying a predetermined image on the screen. Accordingly, it is not necessary to dispose a processing section for performing only image search so that the construction in hardware is simplified. Further, when various kinds of image processings are performed, the above high resolution image information is read out of the optical disk and is then stored to another one of the above page buffers, performing a predetermined image information processing with respect to the stored information. Furthermore, the system comprises a function for performing in parallel the screen display in the image search operation and the processings of various kinds of image information. Accordingly, the operator can execute a plurality of processings in parallel to each other and thereby can rapidly execute a series of various kinds of processings.

Many widely different embodiments of the present invention may be constructed without departing from the spirit and scope of the present invention. It should be understood that the present invention is not limited to the specific embodiments described in the specification, except as defined in the appended claims.

What is claimed is:

1. A control apparatus of an image filing system, comprising:

an image memory means for storing high resolution image information and low resolution image information in order to display a manuscript image of each page of a manuscript at low resolution and to print the manuscript image at high resolution;

a plurality of page buffers for temporarily storing the high resolution image information and the low resolution image information;

an image display means including a monitor, for reading the low resolution image information out of said image memory means, storing the read low resolution image information at one of said page buffers and displaying the manuscript image on a monitor on the basis of the stored low resolution image information;

an image processing means for reading the high resolution image information out of said image memory means, storing the read high resolution image information at another one of said page buffers and printing the manuscript image by a printing means on the basis of the stored high resolution image information;

a functional means for performing in parallel image display and image processing in such a manner that a first manuscript image is printed on the basis of a first high resolution image information stored at said page buffers while a second high resolution image information relating to a second manuscript image is stored at said page buffers, and a first low resolution image information stored in said image memory means relating to the second manuscript image is further read out to said page buffers and the second manuscript image is displayed on said monitor; and a control means for controlling operations of said image memory means, said plurality of page buffers, said image display means, said image processing means and said functional means so as to cause said functional means to perform in parallel the image display and the image processing.

2. A control apparatus of an image filing system according to claim 1, in which said image processing means is adapted to data-extend and temporarily store at said another one of said page buffers the high resolution image information of each page of the manuscript.

3. A control apparatus of an image filing system according to claim 2, in which said image display means is adapted to data-compress and temporarily store at said one of said page buffers the low resolution image information.

4. A control apparatus of an image filing system according to claim 1, in which said image display means is adapted to thin out the low resolution image information.

5. A control apparatus of an image filing system according to claim 1, in which said image display means is adapted to change the data of the low resolution image information to data which is different in amount and corresponds to a manuscript image which can be displayed in real size on said monitor.

* * * * *